Patented May 29, 1928.

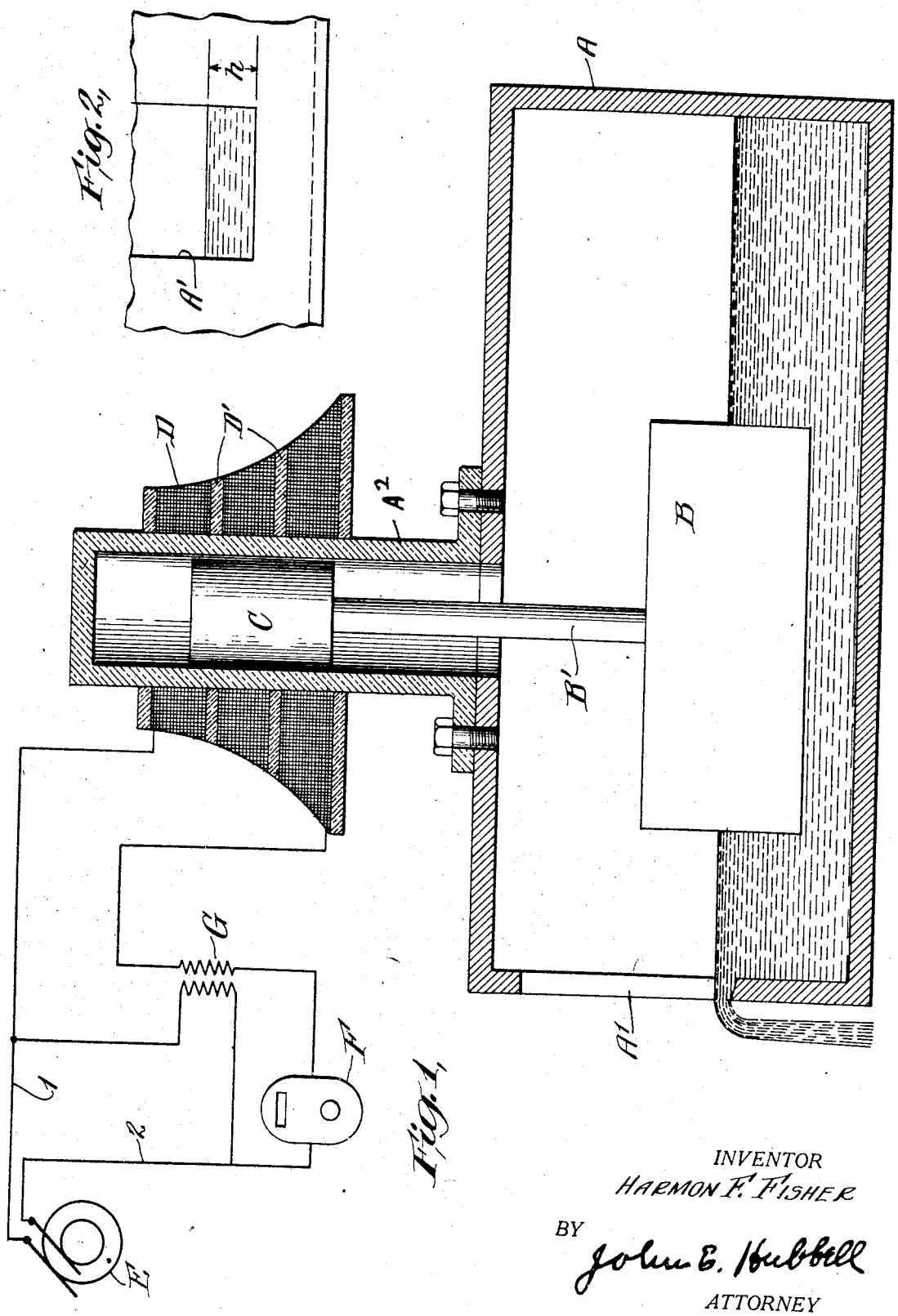

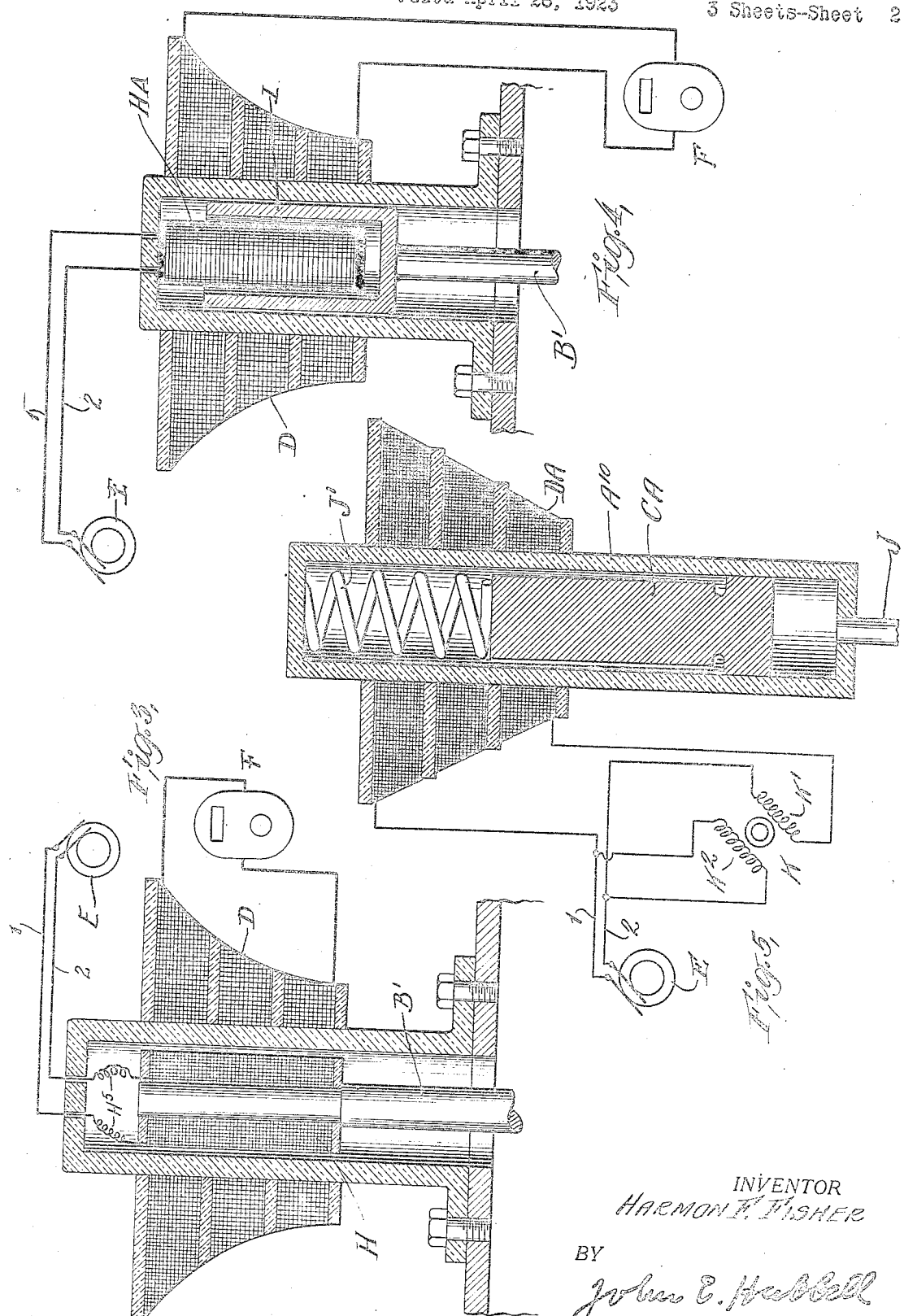

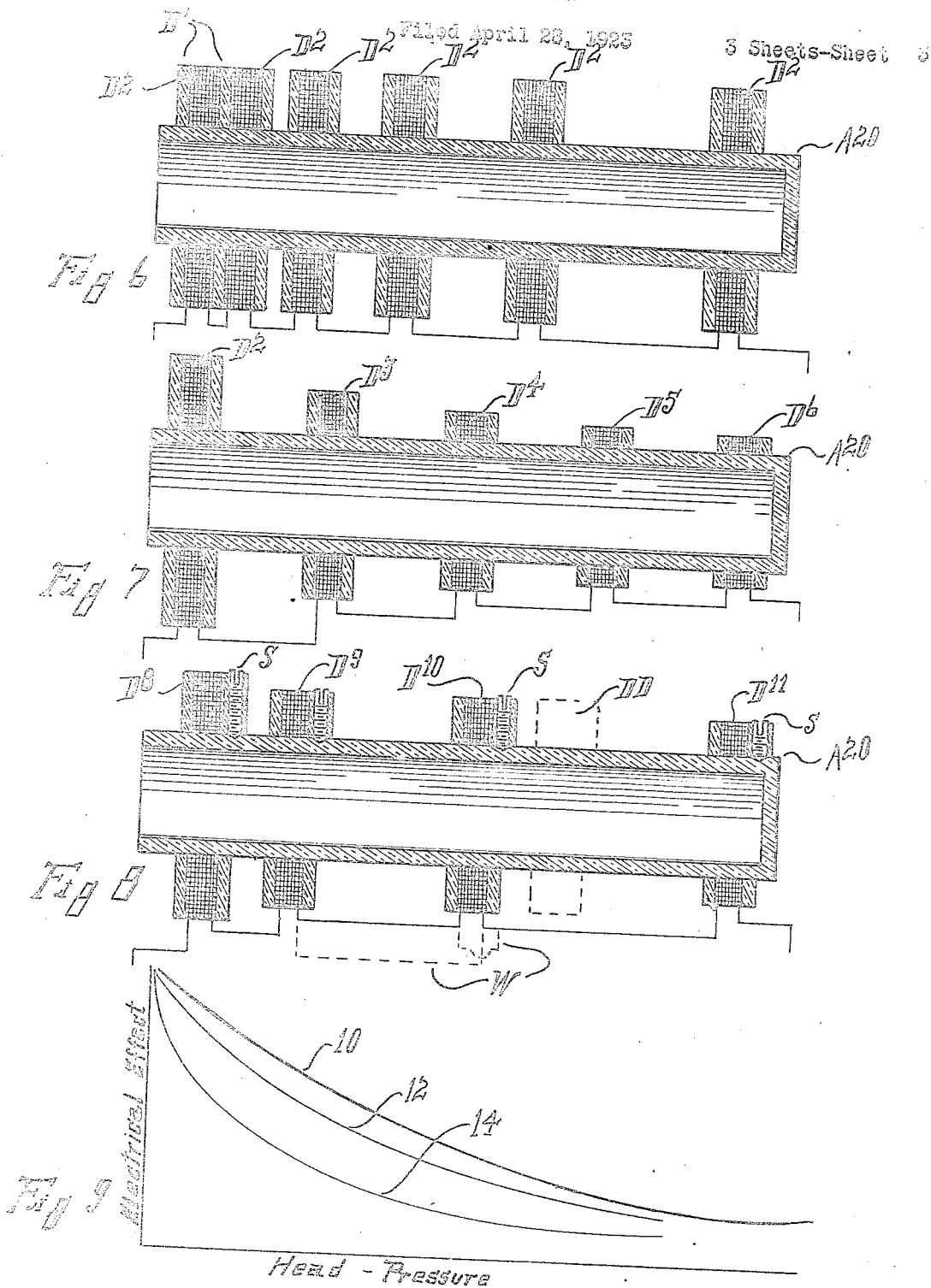

1,671,106

UNITED STATES PATENT OFFICE.

HARMON F. FISHER, OF NEW YORK, N. Y., ASSIGNOR TO COCHRANE CORPORATION, OF PHILADELPHIA, PENNSYLVANIA, A CORPORATION OF PENNSYLVANIA.

FLOW METER.

Application filed April 28, 1923. Serial No. 635,188.

The general object of my present invention is to provide improved apparatus for measuring a fluid rate of flow. More specifically, the object of my invention is to provide means for creating an electrical indicating or controlling effect varying in linear proportion with a fluid rate of flow in response to a change in a fluid pressure or in the height of a liquid level which pressure or height is in itself a non-linear function of the rate of fluid flow.

In carrying out my invention I provide means whereby the changes in the fluid pressure or height of liquid level resulting from changes in a fluid rate of flow, produce a proportional displacement of an induction adjusting element forming a part of an alternating current indicating or control system, and I so shape the displaceable induction regulating adjusting device, or a co-operating part, that the change in the inductive relation produced by the displacement of the element may be the desired non-linear function of the displacement.

I further provide means for adjusting and correcting the aforesaid electrical indicating or controlling effect as a whole, or for any given point from its least to its greatest effect, so that the relation produced may be corrected to the exact function for a given condition without preventing the correction for any other given condition.

Electrical apparatus heretofore employed for indicating rates of fluid flow or pressure have presented a scale so far from having equal scale divisions that one portion of the scale presented was so cramped as to be unreadable while other portions were so spread that but a few units of flow could come within range of an indicator scale of reasonable size, results obtained with recording devices were even more inconvenient and necessitated special charts and mechanical devices to obtain average or total values for purposes of computation. In a few cases corrections by means of adjustable resistances were attempted, with poor success since the resistance values varied with temperature changes and still more seriously with the enormous comparative changes in contact resistances, for contacts of some sort were essential to the obtaining of changes in resistance values.

The herein disclosed invention provides means for the entire removal of contacts and for the elimination of the unpredictable variations which have heretofore acted as a bar to successful operation.

Many other valuable features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated preferred embodiments of my invention, employing like symbols to indicate like parts throughout the several views, of which:

Fig. 1 is an illustration of a form of the invention adapted for use in measuring the flow of liquid over a weir;

Fig. 2 is an elevation taken at right angles to Fig. 1 showing the weir notch;

Fig. 3 is a diagram illustrating a modification in the adjusting means of Fig. 1;

Fig. 4 is a diagram illustrating a second modification of the means employed in Fig. 1;

Fig. 5 is a diagrammatic representation of a control system.

Fig. 6 shows diagrammatically a modified form of coil adapted to facilitate construction of one embodiment of my invention.

Fig. 7 serves to illustrate a further modification in coil construction.

Fig. 8 illustrates another modification in the construction of the coils or solenoid.

Fig. 9 presents in graphic form some of the beneficial results accomplished.

In the drawings, and referring first to construction shown in Fig. 1, A represents a weir chamber from which liquid flows through the weir notch A', so that the rate of flow through the weir chamber will be some function of the height of liquid level therein. The float B rising and falling with the liquid level in the weir chamber carries an induction adjusting device C at the upper end of the float stem B'. The device C is in the form of a magnetic body or core, which is axially adjusted in a reactance coil D mounted on the casing $A^2$ surrounding the device C, by the rising and falling movements of the float B. The terminals of the coil D are connected by conductors 1 and 2 to a source of alternating current conventionally indicated by the generator E. F represents an indicating device in the form of a meter, such as an ammeter which may or may not have recording or integrating provisions, and is connected in circuit with the coil D. The reactance of the coil D should be at its maximum, and the current flow through the meter F at its minimum when the float B is in the position occupied by it when the water level in the weir chamber A is at the bottom of the weir notch A' so that there is then no flow through the weir chamber. As the flow increases through the weir chamber, and the height of the liquid level in the latter rises, the float B lifts the core C and reduces the reactance of the coil D, and thus increases the flow through the meter F. In general the rate of flow through the weir notch A' will not vary in linear proportion to the height $h$ (see Fig. 2) of the liquid level above the bottom of the weir notch. When the weir notch is shaped as shown in Fig. 2, the liquid flow through the weir chamber will be approximately proportional to the quantity $h$ raised to the three halves power $\left(h^{\frac{3}{2}}\right)$. If the weir notch were of the commonly employed V shape, the rate or liquid flow would be approximately proportional to the quantity $h$ raised to the five halves power $\left(h^{\frac{5}{2}}\right)$. With other weir shapes varying proportions between the head $h$ and the flow would be obtained.

In accordance with the present invention, I make the current flowing through the meter F vary in linear proportion to the rate of flow over the weir, by tapering the coil D in the general manner indicated, so that its reactance will vary according to the law of flow over the weir as the core C rises and falls. For example, with the type of weir notch shown in Fig. 2, I so shape the coil D, and so arrange it with reference to the core C, that the current flow through the meter F increases in proportion to the three-halves power of the quantity $h$, as the float B rises from its no flow level. It will however be evident that I may so shape the coil D and the relationship of the parts of this coil to the core C that any desired rate, or varying rate, of current change may be obtained. For convenience in forming the specially shaped coil D the latter may well be made in sections separated by the insulation members D' as indicated, or may be constructed in entirely separate, and adjustable, sections as will be hereinafter described.

To eliminate or minimize errors due to fluctuation in the voltage of the source E, when this is necessary or desirable, I may advantageously employ a compensating transformer G as shown in Fig. 1, with its primary coil connected across the conductors 1 and 2 and with its secondary coil connected in series with the meter F and the coil D, so that the transformer voltage normally "bucks" or opposes the voltage in the reactance line. A drop in potential of the source E reduces the opposition, or buck, of the transformer G and tends to compensate for such potential drop by reducing the retarding effect upon voltage in the reactance line. A rise in potential would effect an increased retarding effort, and compensation may thus be obtained. The same results may be employed by utilizing a similar transformer arranged to "boost," or by employing auxiliary winding about the coils of the reactive coil D or the coils of the meter F as will be understood by those skilled in the art.

In lieu of the particular means shown in Fig. 1, other forms of induction adjusting means may be employed, and in Figs. 3 and 4, I have illustrated by way of example, two different modifications in this respect. In the modification shown in Fig. 3, the core C of Fig. 1 is replaced by the primary coil H of a transformer, the terminals of the coil being connected through the flexible leads H⁵ to the conductors one and two (1 and 2) and thereby to the alternating current source E. In this arrangement the coil D forms the secondary winding of the transformer and has its terminals connected to the meter F. In the Fig. 3 the coil D is turned end for end with respect to the position occupied by it in Fig. 1, so as to increase the mutual inductance between the primary coil H and the secondary coil D, as the primary coil is raised.

In the modification shown in Fig. 4, the core C of Fig. 1 is replaced by a hollow tubular magnetic shield I interposed between the coil D and a stationary coil HA. The latter has terminals connected to the source of alternating current E as the coil H is connected in Fig. 3, while the coil D is connected to the meter F as in Fig. 3. In this arrangement the elevation of the shield I will diminish the mutual inductance between the coils D and HA, and thereby diminish the current flow through the indicator F. In this manner indications varying along the same curve as that of the arrangements previously described, but in an opposite direction are produced. That is to say the lowest position of the shield, I, will produce the greatest current through the meter F and hence the largest indication, while the highest position of the shield I will produce the least current in the meter F and hence the smallest indication. Thus it will be seen that varying relationships between the height $h$ (see Fig. 2) and the indications of the meter F, even to the extent of an entirely reversed relationship curve may be obtained.

In Fig. 5 I have illustrated a control system in which a magnetic core CA forms, or is carried by, a piston working in a cylinder $A^{10}$, and subjected at one end to a fluid pressure transmitted through the pipe J, the displacement of the piston by the fluid pressure being opposed by a helical spring J', the tension of which increases with its compression. Surrounding the cylinder $A^{10}$ is a coil DA which may be similar in form to the coil D first described, and which has its terminals connected to a source of alternating current E in a circuit which includes the winding K' of the alternating current motor K, having a second winding $K^2$ connected across the supply conductors 1 and 2. With the arrangement shown in Fig. 5 the speed of the motor K may be varied in linear proportion to changes in the pressure transmitted by the pipe J, although owing to the increased tension of the spring J' as the latter is compressed, the displacement of the core CA will not be in linear proportion to the changes in said pressure.

To facilitate the adjustment and construction of coil D I have found it advantageous to construct this coil as is indicated in Figs. 6, 7 and 8. In these three figures the casing $A^{20}$ is of the same general form and adapted to serve all of the purposes of the casings and cylinders referred to in connection with the previously described views, and it will be plain that such changes in form as will adapt this casing for interchangeability with the other casings and cylinders described may be made without in any wise altering its function as an element of my invention.

In Fig. 6, the coil D will be seen to be divided into six sections $D^2$, of like electrical characteristics. The field, or lines of magnetic flux, formed about a coiled conductor is not confined to the mechanical outline of the coil itself but extends out and beyond such confines, it is thus possible for the flux lines due to the several sections $D^2$ to so interlink and combine that the resultant field form may be made identical with the field form for a coil constructed as the coil D previously shown. Since the sections $D^2$ may be made of standard size and shape, a substantial saving in materials and more especially in labor and convenience of construction, with a consequent reduction in cost and increase in utility, is made possible. Referring to Fig. 6 it will be noted that the sections $D^2$ are exactly similar but are spaced unequally upon the casing $A^{20}$ producing the variation required to establish the desired relationship between the height, or pressure, and the indication required.

In other cases it has been found preferable to produce the desired variation by utilizing coil sections varying in electrical characteristics as shown in Fig. 7 at $D^2$, $D^3$, $D^4$, $D^5$ and $D^6$. These coils are shown as spaced equally distant upon the casing $A^{20}$, but where still greater variations are required, these coils may be spaced unequally as were those in Fig. 6.

In the construction of instruments having any considerable degree of accuracy it is essential that adjustments be provided so that corrections may be made at the time of assembly and thereafter as operating conditions may require, further it is extremely desirable that correction of one portion, or single point of indication, of the indicating scale be adjustable independently of any other portion or point. Such correction has heretofore involved the recalibration of the indicator and the remaking of the indicator scale while in the case of recording or graphic instruments the error must either be ignored entirely or special charts, computations, and other cumbersome inaccurate methods employed.

My improved spaced section form of coil provides not only for shaping the indication scale initially, but also for the correction of the whole scale of indication, or any desired part thereof. Reference to Fig. 8 will disclose coil sections $D^8$, $D^9$, $D^{10}$ and $D^{11}$ moveable upon the casing $A^{20}$ but securable thereto in any adjusted position by such means as the set screws S.

Fig. 9 shows in graphic form an assumed relationship between head, or pressure, and electrical effect upon the indicator, and is designed to make clear the preferred method of adjustment and to afford some comprehension of the range of adjustment and of the relationships obtainable. Curve 10 indicates the initial curve form, then by shifting, for purposes of illustration, the coil section $D^{10}$ to the position indicated by the dotted lines DD the curve may be made to assume the form 12. Or by reversing the connections to $D^{10}$ as indicated by the dotted lines W it becomes possible to obtain a curve shaped as at 14 while short circuiting $D^{10}$ would produce a similar but less pronounced effect.

It will be understood that such changes need not be confined to the section $D^{10}$, and that by the use of suitable coils, or coil sections, by changing their interconnections and by altering their position upon casing $A^{20}$, the field of the complete solenoid may be shaped and formed as desired while the continuity and resistance remain undisturbed.

The present application is in part a continuation of my abandoned copending application, Serial No. 335,625, filed November 4, 1919.

While in accordance with the provisions of the statutes, I have illustrated and described the best forms of my invention now known to me, it will be apparent to those skilled in the art that many changes in embodiment, as for instance shaping of the internal outlines in preferance to the external, may be made without departing from the spirit of my invention as set forth in the appended claims, and that some features of my invention may sometimes be used to advantage without a corresponding use of other features.

Having now described my invention, what I claim as new and desire to secure by Letters Patent, is:

1. In apparatus of the character described the combination of a tapered coil, a magnetic body, means for moving said body axially of said coil in non-linear proportion to changes in a variable quantity, means connecting said coil to a source of alternating current, electrical indicating means connected to said coil and responsive to the inductance changes thereof, said coil being so tapered that the inductance changes produced by the movements of said body are in linear proportion to the changes in said quantity.

2. In apparatus of the character described the combination of a tapered coil, a magnetic body, means for moving said body axially of said coil in non-linear proportion to changes in a variable quantity, means connecting said coil to a source of alternating current, electrical indicating means connected to said coil and responsive to the inductance changes thereof, said coil being so tapered that the inductance changes produced by the movements of said body are in linear proportion to the changes in said quantity and being composed of axially displaced coil sections of different external diameters.

3. In apparatus of the character described the combination of a coil, a magnetic body, means for moving said body axially of said coil in non-linear proportion to changes in a variable quantity, means connecting said coil to a source of alternating current, electrical indicating means connected to said coil and responsive to the inductance changes of said coil being composed of coil sections so axially displaced and relatively proportioned that the inductance changes produced by the movement of said body are linear proportions to changes in said quantity.

4. In weir measuring apparatus, the combination with a weir of a float rising and falling with the height of liquid level on the supply side of the weir, and means actuated by said float for maintaining an electrical current effect varying in linear proportion with the changes in rate of flow over the weir, and comprising two cooperating devices in inductive relation with one another, one of which is a coil having a tapered field, and provision whereby said devices are relatively adjusted axially of said coil by rising and falling movements of the float.

5. In weir measuring apparatus, the combination with a weir, of a float rising and falling with the height of liquid level on the supply side of the weir, a stationary coil having a tapered field, a magnetic core carried by said float, and axially adjusted in said coil by the rising and falling movements of the float, and a source of alternating current, and an electrical instrument connected to said coil.

Signed at New York city in the county of New York and State of New York this 26th day of April A. D. 1923.

HARMON F. FISHER.